UNITED STATES PATENT OFFICE.

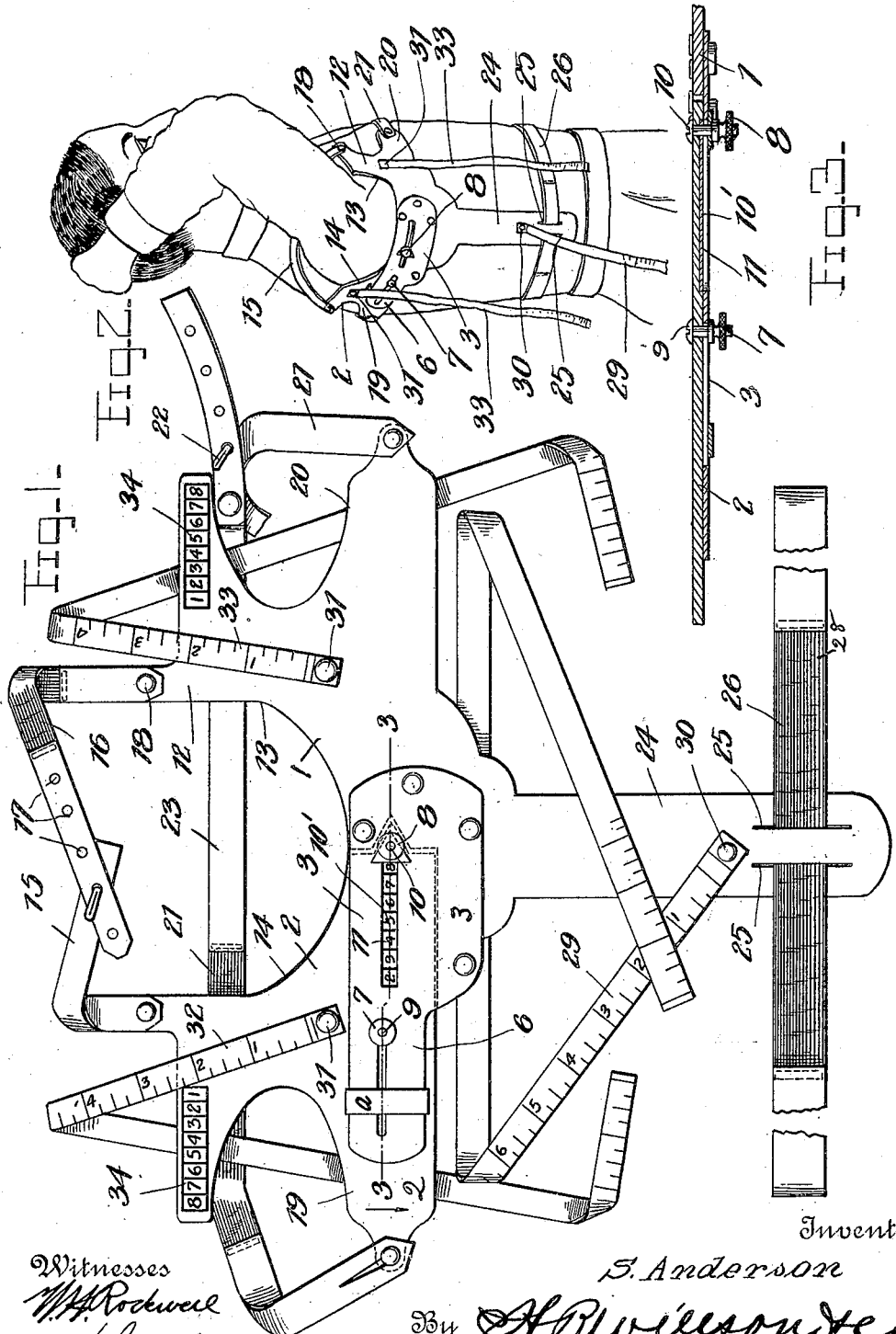

SAMUEL ANDERSON, OF BROCKTON, MASSACHUSETTS.

TAILOR'S MEASURING DEVICE.

No. 902,704.

Specification of Letters Patent.

Patented Nov. 3, 1908.

Application filed April 24, 1908. Serial No. 428,982.

*To all whom it may concern:*

Be it known that I, SAMUEL ANDERSON, a citizen of the United States, residing at Brockton, in the county of Plymouth and State of Massachusetts, have invented certain new and useful Improvements in Tailors' Measuring Devices; and I do declare the following to be a full, clear, and exact description of the invention, such as will enable others skilled in the art to which it appertains to make and use the same.

This invention relates to a device for taking measurements for making coats and vests, and has for its object to provide a device of this kind which is easily applied to the body of the person to be measured and which will automatically determine certain measurements and also hold the device in convenient position for making various other measurements.

For these and still other objects which will appear as the description proceeds the invention consists of certain novel features, arrangements and combinations of parts of which the herein described tailor's measuring device is one of many possible embodiments.

While herein the description refers to minute details of the invention, the invention is not limited to these as the details of construction and combination may be greatly varied without departing from the spirit and scope of the invention.

In the annexed drawing forming a part of this specification in which like reference characters refer to like parts throughout the several views and which are for illustrative purposes only and therefore not drawn to any particular scale,—Figure 1 is a view showing the device detached and spread out flat; Fig. 2 is a side view showing the same applied to the body of the person to be measured; and Fig. 3 is a sectional view taken on the line 3—3 of Fig. 1.

The main part of the device comprises a stationary body portion 1 and a sliding side portion 2 connected to said stationary portion 1 by means of a plate 3 connected in any suitable manner to the portion 1 by means of rivets or the like, the movable part 2 being provided with a strip $a$ of suitable material adapted to be formed into a loop to slidably receive the reduced end 6 of the plate 3 milled heads 7 and 8 mounted upon screws 9 and 10 passing through the sliding portion 2 and slots 10' in the plate 3 hold the same in adjusted position. A scale 11 is provided to register with the slot 10' for a purpose which will appear hereinafter. The body portion 1 is provided with an upwardly extending member 12 having a curved inner edge 13. The movable portion 2 is provided with a correspondingly curved upper member 14 said members together forming a U-shaped opening adapted to fit under the arm of the person to be measured. The distance between said members 12 and 14 may be adjusted by means of the mill heads 7 and 8 to vary the size of the U-shaped opening thus showing at a glance by means of the scale 11 the arm measurement. A shoulder strap 15 provided with a piece of elastic 16 adjustably connects the upper ends of the members 12 and 14. The strap 15 being provided with a plurality of openings 17 is adapted to be received over the button 18 on the member 12. The portions 1 and 2 are provided with oppositely extending arms 19 and 20 to the ends of which are fastened the breast strap 21. Said strap consisting of strap portions adjustably connected as at 22 and being provided with a piece of elastic 23 to cause the same to firmly engage the person being measured. The body portion 1 is provided with a downward extension 24 which extends to the waist line and is provided with a double slot 25 adapted to receive a waist band 26 the ends of which are provided with an adjustable fastening and the intermediate portion of which is provided with a bit of elastic 28. The downward extension 24 is provided intermediate its ends but nearer the lower end with a lower tape measure 29 pivotally secured as at 30 to said extension. Near the lower ends of the members 12 and 14 are pivotally secured as at 31, the balance tapes 32 and 33. The members 12 and 14 being provided with a balance scale 34 across which the balance tapes 32 and 33 are passed in making certain of the measurements.

The operation of the device is as follows: The device is placed with the U-shaped opening formed by the members 12 and 14 receiving the arm fitting closely up under the arm pit with the downward extension 24 extending directly downward directly under the arm pit. The shoulder strap 15 is passed over the shoulder and fastened as at 18 to hold the measuring device firmly in place. The breast measuring is then passed snugly around the waist and secured at 22. The waist measure is in like manner secured snugly around the waist. This leaves the lower tape 29 free to measure the position of various points relative to the point 30. With this tape the various lengths as for instance the length of a coat or the waist measure may be taken. The device as shown is adapted to be fitted to either side of the body and either of the tapes 32 or 33 may be used to measure various points as for instance the length of the sleeves and in passing the tape across the balance scale 34 to a predetermined point selected by the measurer, the "balance" may be determined. As stated the sizes of the arm hole may be measured by means of shifting the slot 10 upon the scale 11. This device after being applied to the person's body will indicate various points of measurement which have to be made at particular points.

Having thus described and ascertained the nature of my invention, what I claim as new is:

1. In a device of the class described a stationary body portion and a movable portion adjustably connected thereto, said portions having upwardly extending members forming a U-shaped opening adapted to be closed upon the arm of the person to be measured, straps secured to the upper end of said members to pass over the shoulder, a strap secured to the free lateral ends of said portions to pass around the breast, one of said portions being provided with a downwardly projecting extension having a waist strip secured thereto, tapes pivotally secured to said members, and a tape pivotally secured to said extension.

2. In combination a body portion having a plate extending from the inner edge thereof, said plate being provided with a pair of slots in tandem, a movable portion adapted to slide on said plate, screws secured to said movable portion and passed through said slots, milled heads on said screws, said movable member being provided with a strip forming a slot said plate being provided with a free end adapted to pass through said slot and a scale secured to said movable portion and adapted to coöperate with one of said slots, upwardly extending members on said body forming an upwardly opening U, an adjustable strap connecting the outer ends of said U, scales extending substantially transversely of the upper end of said members, tapes pivoted near the lower ends of said members and adapted to cross said scales, a downward extension connected to said body portion having a tape pivoted thereon near its lower end said extension being provided with a pair of slots on its lower end a waist band passing through said slots said portions being provided with lateral extensions the free ends of said lateral extensions being adjustably connected by means of a breast band.

3. In combination a body portion having a plate extending from the inner edge thereof, said plate being provided with a pair of slots in tandem, a movable portion adapted to slide on said plate, screws secured to said movable portion and passed through said slots, milled heads on said screws, said movable member being provided with a strip forming a slot, said plate being provided with a free end adapted to pass through said slot and a scale secured to said movable portion and adapted to coöperate with one of said slots, upwardly extending members on said body forming an upwardly opening U, an adjustable strap connecting the outer ends of said U, scales extending substantially transversely of the upper end of said members, tapes pivoted near the lower ends of said members and adapted to cross said scale, a downward extension connected to said body portion having a tape pivoted thereon near its lower ends, said extension being provided with a pair of slots on its lower end a waist band passing through said slots said portions being provided with lateral extensions, the free ends of said lateral extensions being adjustably connected by means of a breast band, said shoulder strap, said breast band, and said waist band being provided with elastic therein.

In testimony whereof I have hereunto set my hand in presence of two subscribing witnesses.

SAMUEL ANDERSON.

Witnesses:
SVEN E. MOBERG,
AMANDUS MOBERG.